Jan. 24, 1967   H. ROSENTHAL   3,299,756
WEB SEVERING DEVICE HAVING MEANS TO BLOW WEB MATERIAL
CLEAR OF SEVERING MEANS
Filed March 30, 1965   2 Sheets-Sheet 1

Inventor:
Harry Rosenthal
By: Mueller, Aichele & Rauner
Attys.

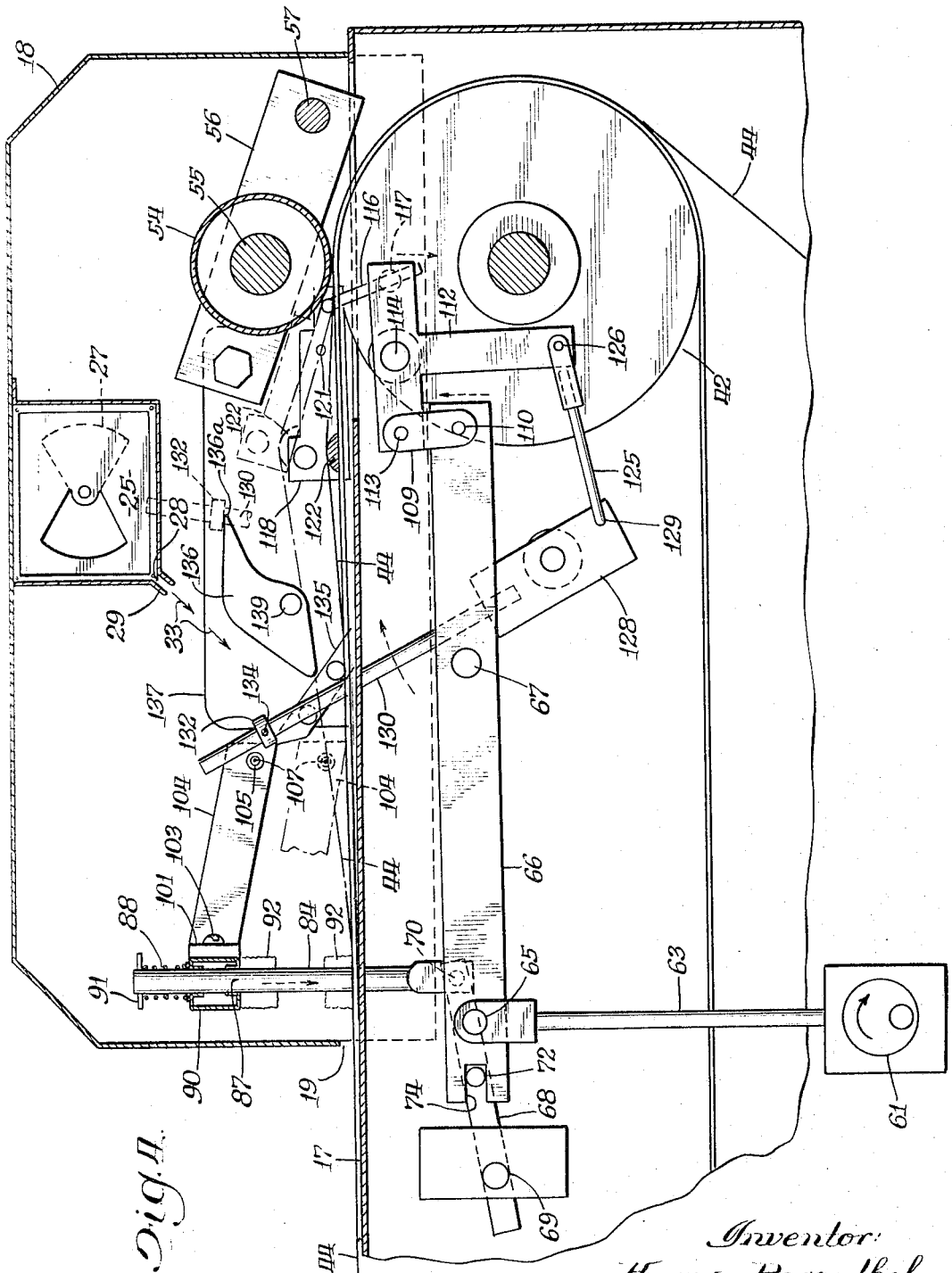

3,299,756
WEB SEVERING DEVICE HAVING MEANS TO BLOW WEB MATERIAL CLEAR OF SEVERING MEANS
Harry Rosenthal, 3825 Greenwood, Skokie, Ill. 60076
Filed Mar. 30, 1965, Ser. No. 443,894
5 Claims. (Cl. 83—98)

This invention pertains generally to an air blower and more specifically to an air blower for use in a machine for feeding and cutting web-like material.

Machines have been provided for cutting web-like material such as polyethylene by use of a heated wire. Such a machine is described and claimed in Patent No. 3,177,748 issued to applicant. The severed ends of the web material may, due to a melting and solidifying action, adhere to the wire thereby fouling the next cutting cycle. In addition, in such machines the material may be raised to engage the cutting wire, making it desirable that the uncut portion be returned to a supporting table or conveyor to prevent tangling prior to the next cutting cycle. It is equally desirable that the severed portion should not be permitted to return to tight frictional engagement with the conveyor, so that the operator of the machine can grasp the severed sheet material without taking the time to peel it from the belt.

It is, therefore, an object of this invention to provide a machine for feeding and cutting web-like material, wherein the cut edges of the material are freed from the cutting device.

It is still another object of this invention to provide a machine for cutting web-like material wherein the severed end of the material is freed from the support so that the piece cut off can be easily grasped and removed, and the end remaining is returned to the support.

It is another object of this invention to provide an air blower for use in a machine for feeding and cutting web-like thermoplastic material and which uses a cutting wire to apply a stream of air to the severed ends of the material to free the same from the cutting wire.

One feature of this invention is the provision in an air blower for use in a machine for feeding and cutting web-like material and which uses a cutting wire, having an air duct with a vent positioned to direct a stream of air to the point where the cutting wire engages the material, thereby blowing the cut edges of the material clear of the cutting wire.

Another feature of this invention is the provision in an air blower for use in a machine for feeding and cutting web-like material which uses a cutting wire, having an air filter connected to the intake of the blower and a variable shutter mounted in the end of the air duct for regulating the flow of air through the duct and providing access for cleaning the same.

Still another feature of this invention is the provision of a feeding and cutting machine including a tensioning clipper bar which coacts with a clamping bar to stretch a section of film to be severed above the surface of the conveyor belt into engagement with a heated cutting wire, with an air blower positioned to direct a stream of air on the heated wire to clear the severed edges of the material from the knife. The stream of air returns the remaining unsevered portion of the material into frictional contact with the conveyor belt to prevent tangling during the next cutting cycle, and moves the severed edge of the material away from the conveyor, thereby permitting the material to be easily grasped and removed from the conveyor belt.

In the drawing:

FIG. 4 is a sectional side elevation taken generally along lines 4—4 of FIG. 1 with the cutting cycle shown in phantom.

The machine of the invention includes a conveyor belt which frictionally draws a sheet of web-like material, such as polyethylene film, from a storage roll to a work area. A timer mechanism controls the amount of material fed by the conveyor. When the preselected length is reached, a set of cam actuated linkages causes various elements to clamp the material against the conveyor at one point and raise the material off the conveyor at another point bringing the material into contact with a heated wire which acts as a cutting device. A blower mounted to the machine directs a stream of air by means of a duct and vent towards the point where the material is severed by the wire. This air blows the severed edges of the material clear of the cutting wire and cooperates with a sweeping element to re-establish frictional engagement of the unsevered portion of the material with the conveyor immediately subsequent to the cutting action, thereby preventing tangling of the web in the machine prior to the next cutting cycle. In addition the air holds the severed end of the material away from the conveyor thereby permitting the material to be easily grasped in order to remove the same from the conveyor.

Figure 1:
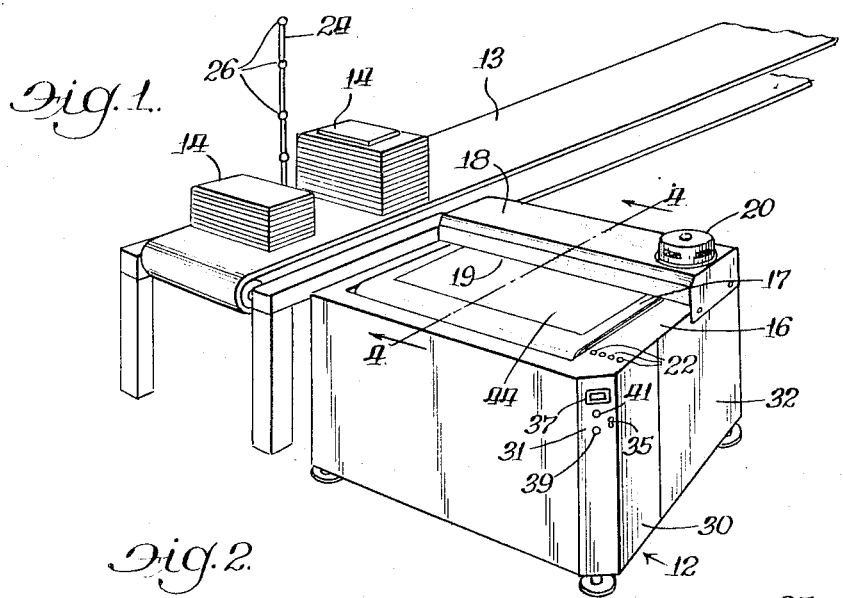
FIG. 1 is a perspective view of the machine of the invention showing the blower air intake and filter.

Referring in more detail to the accompanying drawing, FIG. 1 illustrates a pushbutton controlled sheet material feeding machine 12 in accordance with this invention. The machine illustrated is similar to the machine described and claimed in the aforesaid Patent No. 3,177,748.

The machine 12 may be positioned for use near the end of the belt conveyor 13 on which bundles 14 of laundry or the like are placed prior to being wrapped. The machine 12 has a flat wrapping table 16 which is substantially on the same level as conveyor 13. Most of the surface of the table is covered by the upper portion or an endless conveyor belt 17 which travels from under a roll cover 18 at the rear of the table and enters the table at the front through a slotted portion 19. A severing mechanism, described subsequently in detail, is concealed within roll cover 18, and polyethylene or other plastic film 44 is fed underneath roll cover 18 and on to the table 16 by means of the conveyor belt 17. An air intake and filter 20 for a blower is mounted on top of the roll cover 18. Conveyor belt 17 is made of a material to which film 44 will adhere sufficiently to permit the belt to draw the film from its supply roll.

The operator controls the amount of film which is fed and severed by means of pushbuttons 22 located near the right front edge of the wrapping table 16. In order to enable the operator to gauge accurately the amount of sheet material which is required, there is provided near the conveyor 13 a standard 24 on which are mounted various indices 26 in vertically spaced relation. The indices 26 and the buttons 22 have corresponding colors to aid the operator in selecting the proper button. The machine thereupon feeds the appropriate amount of plastic material onto the wrapping table 16 and severs this length of material. The operator then lifts the bundle of laundry 14 onto the severed piece of plastic and wraps the bundle in this plastic material.

The lower part of the machine 12, below the wrapping table 16, is enclosed by a housing 30. On the right hand side of the machine, as viewed in FIG. 1, there is a control panel 31 which includes the main power switch 35, a counter 37, a manual feed switch 39, and a manual cut switch 41. A removable panel 32 is provided behind which are disposed most of the operative mechanisms of the machine.

As shown in FIG. 4, a hold down roller 54 presses the plastic film web 44 against the top of the feed roller 42. This roller 54 is rotatably mounted on a shaft 55 which is fixed at its end to a pair of pivotally mounted arms 56. A handle bar 57 is supported by the free end of arms 56 and spans the distance therebetween and tends to weigh down the roller 54, and also provides a convenient means for raising roller 54 so that the end of a plastic web such as 44 may be inserted between the rollers 42 and 54.

The severing mechanism of the machine is actuated by an electric motor (not shown) turning a pair of concentric cams 61 on opposite sides of the machine. Only the cam on one side is shown and in the following description reference will be made to mechanisms which appear on both sides of the machine, with only one side shown. Cam follower rod 63 translates the rotating motion of the cam 61 into vertical motion. Since the follower rods 63 are pivotally mounted by rod 65 to the rocker arms 66, this vertical motion causes the arms 66 to pivot about fixed pivot 67. The pivoting motion of rocker arms 66 is used to drive two separate sets of linkages at the forward ends of the arms 66 consists of connecting rods 68 which are fixedly pivoted at 69 and pivoted to the riser bars 84 at 70. Pins 72 extend from the connecting rods 68 and movably and slidably rest in the slot 74 in arms 66. Sliding action of pins 72 in slots 74 as the arms 66 pivot about 67 translates the pivoting motion of the arms 62 into vertical motion for moving riser bars 84 up and down. An elongated hold down bar 90, provided with holes near the end thereof, is received on the reduced upper end of the bar 84 so that it rests on shoulders 87. A compression spring 88 has one face resting against the hold down bar 90 and the other face abutting against fixed sleeve 91, and serves to bias the hold down bar 90 firmly against the shoulder 87. Hold down bar 90 thus spans the endless belt 17 and moves vertically with the pivoting motion of the arms 66. A clamping member 92 preferably formed of sponge rubber, is affixed to the underside of hold down bar 90 for engaging and pressing the sheet material 44 against the endless belt 17 when the hold down bar is in its lowest position.

Hold down bar 90 also supports brackets 101 which are mounted to the rear side of the hold down bar by means of bolts 103 and which have arm portions 104 extending rearwardly and downwardly therefrom. The outer ends of the arm portions 104 support collars 105 which are adopted to hold a Nichrome severing wire 107 therebetween. The wise is energized from a relay and upon heating expands to operate a switch to open the relay thereby preventing the wire from overheating.

Referring now to the linkage at the rearward end of arm 66, connecting links 109 are pivotally mounted to the arms 66 at 110 and to the T-links 112 at 113. T-links 112 are fixedly pivoted at 114 and actuated by the pivoting motion of the arms 66 to move two separate sets of linkages. T-links 112 are pivotally connected to the lower end of adjustable linking members 116 at 117. The upper end of members 116 are pivotally connected to the rearward end of a pair of flipper arms 118. Arms 118 in turn are pivotally mounted by bearings 121. A flipper bar 122 is supported by the forward ends of flipper arms 118, and spans the endless belt 17 above the surface thereof. Hence, it will be seen that pivoting motion of the arms 66 is effective to pivot the arms 118 so as to raise the flipper bar 122 to the position shown in dotted lines.

Another linkage connected to the T-links provides a sweeping action after the plastic film 44 is severed by the wire 107. Adjustable links 125 are pivotally connected to the bottom of the T-links at 126 and to the pivoting members 128 at 129. Rods 130 are connected to the members 128 and move therewith as they pivot. Collars 132, having a bore which is oversized with respect to the diameter of rods 130, are slidably received on the rods 130. Collars 132 have cam follower rods (not shown) extending from the side thereof, and a sweeping rod 134 is mounted on the opposite sides of collars 132 to extend across the endless belt 17. Inclined cams 135 are fixed to the plate 137, and diamond shaped cams 136 are pivotally mounted to the plate 137 at 139. Forward motion of the rods 130 cause the cam followers to move up the incline of cam 135 raising the collars 132 on the rod 130, and hence the sweeping rod 134. Backward movement of the rod 130 causes the cam followers to ride up the surface of the cams 136 until they reach the point 136a where they drop from the cam permitting the sweeping bar to drop along rod 146 and strike the upper surface of the film 44 back of the cut. As the sweeper bar again moves forward, this straightens the cut end of the film along the endless belt.

Figure 2:
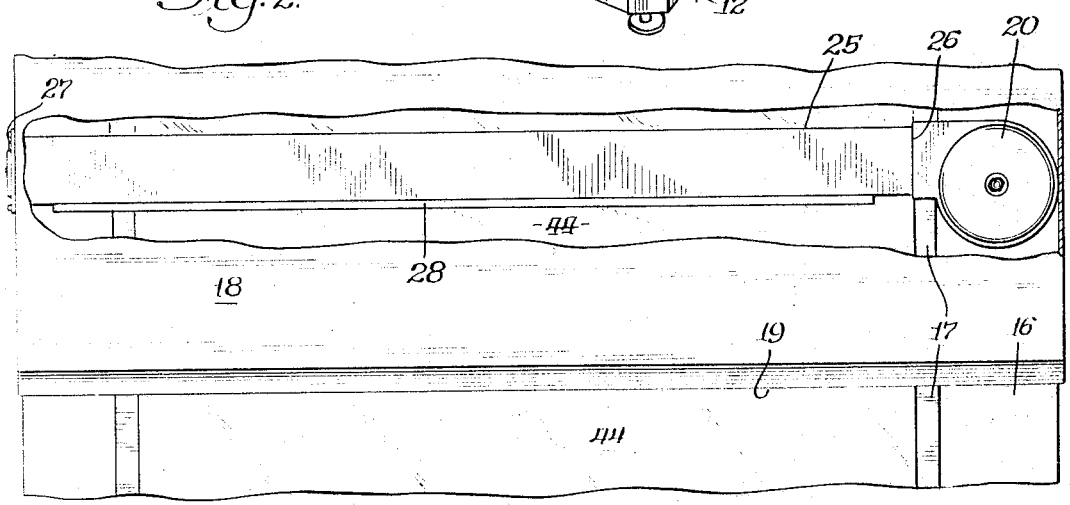
FIG. 2 is a plan view with a part of the roll cover cut away to expose the blower output, air duct and vent.
Figure 3:
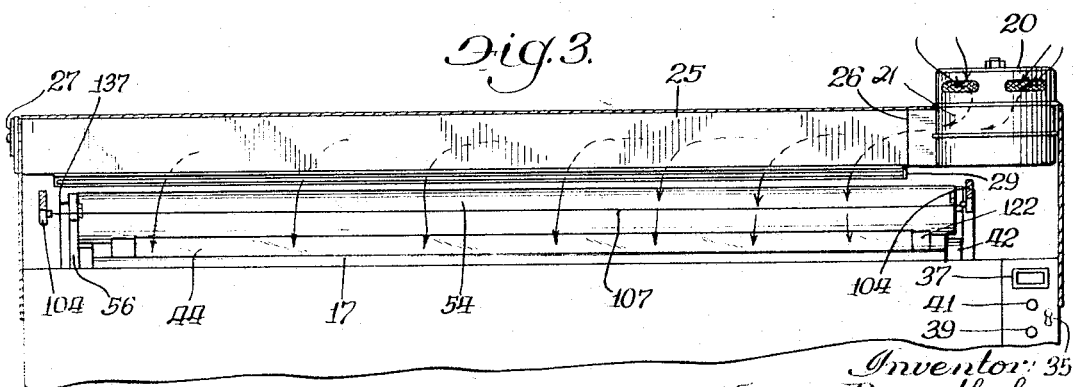
FIG. 3 is a side elevation with the roll cover removed.

Referring now to FIGS. 2 and 3, a blower 19 is mounted in the roll cover 18. The blower may be of standard construction and operated by an electric motor. An air intake filter 20 is mounted on top of the blower 21. A duct 25 extends from the blower output 26 the length of the roll cover 18. Mounted in the duct 25 at the end of the roll cover opposite the blower end is a variable shutter 27 (FIG. 4). The variable shutter regulates the flow of air in the duct by regulating the amount of back pressure on the blower output. The shutter 27 also serves to provide an access for cleaning the duct. The duct 25 includes a vent 28 which runs along the length of the duct 25. The vent therefore spans the endless belt 17. The vent 28 includes a lip 29 for directing the stream of air flowing out of the vent as indicated by the arrows 33. The lip 29 directs the air to a point where the cutting wire 107 engages the material 44 (FIG. 4). The blower is connected so that it operates at all times that the machine 12 is energized.

In operation, the desired amount of plastic film 44 is advanced onto the table 16 in front of the operator, and then cut in accordance with the length selected by operating the appropriate pushbutton 22. During the feeding portion of the cycle, the various elements of the severing mechanism are in the positions shown in solid lines in FIG. 4.

At the appropriate time, the feeding of the plastic web 44 is arrested and the motor (not shown) is energized to cause the eccentric cams 61 to rotate initiating the cutting part of the cycle which is shown in dotted lines in FIG. 4. This causes downward movement of the cam follower rods 63 causing the arms 66 to pivot about fixed pivot 67. When the forward part of the arms 66 pivot downward, this causes downward vertical movement of the riser bar 84 to move the hold down bar 90, hence the clamping member 92, into firm engagement with the plastic web 44, pressing it against the belt 17 and table 16.

Simultaneously, as the front portion of the arms 66 pivot downwardly, the rear portion of the arms move in an upward direction causing the T-link 112 to rotatably pivot in a clockwise direction. This rotating motion causes member 166 to move in a downward direction to raise the flipper arms 118 off the horizontal plane. Since the plastic web 44 is threaded over the flipper bar 122, the web 44 is lifted upwardly from the belt 17 until it is in taut contact with the severing wire 107, the wire 107 having been lowered with the downward motion of the hold down bar 90. Current is applied to the wire and the heat tends to melt the plastic. Since it is under tension from the flipper bar 133, the material 44 instantaneously severs upon contact with the heated wire. While the rotation of the T-links cause the flipper arms 118 to lift up the film 44, the rotating motion is also translated through adjustable links 125 to move the rods 130 in a backward direction. At the instant the material 144 is severed, the cam followers drop off the rear edge 136a of the cams 136, as previously explained, allowing the collars 132 to slide down rods 130 thereby permitting the sweeping rod 134 to engage the cut edge of the film 44 and sweep it back in frictional contact with the endless belt 17. Continued movement of the eccentric cams 61 cause the arms 66 to pivot in the opposite direction to return the cutting linkages to the positions they were in prior to commencement of the cutting cycle.

The stream of air from the blower 21 which is directed from a point above the belt 17 downward to the point where the wire 107 severs the web material 44, as shown in FIGURE 4, serves many useful functions. When the plastic 44 melts, there is a tendency for the cut ends of the material to remain stuck to the wire 107. This is especially true of that portion of the web material 44, which is severed from the supply roll, to be used for wrapping the bundle, as there is no tension placed on it similar to the tension placed on the unsevered portion by the flipper bar 122. The stream of air, therefore, functions to blow the severed ends of the material 44 clear of the wire 107 to prevent tangling of the next cutting cycle caused by the cut edges remaining stuck to the wire 107. The air also blows the end of the unsevered portion of the material 44 back into frictional contact with the belt 17 thereby cooperating with the sweeping rod 134 to prevent fouling of the mechanism. For if the end of the unsevered portion is not recovered in time, as it springs back after being cut due to the tension placed on it by flipper bar 122, it may jam in the rollers, or tangles and bunches up to cause faulty operation. In addition, the air stream causes the cut edge of the material 44, severed from the supply roll, either to be blown back upon the severed material, or to leave an air pocket between the material 44 and the endless belt 17. This breaks the frictional contact between the belt and material to provide an edge which the operator can grasp so that valuable time is not used in peeling the material 44 from the belt 17.

The invention, therefore, provides a machine for feeding and cutting web material using a heated wire, which has a blower directing a stream of air at the point of contact of the cutting wire and the material. The air blows the severed edges of the material clear of the cutting wire, and blows the edge of the unsevered portion back into frictional contact with the conveyor belt. The stream of air also serves to provide for easy removal of the severed material from the belt.

I claim:

1. An air blower for use in a machine for feeding and cutting web-like material and having support means for the material, means for raising the same from the support means and a cutting wire which is engageable with the raised material for cutting the same, said blower including in combination, a blower structure having an air intake and an output, filter means connected to said air input, an elongated air duct having one end connected to said output and extending in a direction transverse to the support means, a variable shutter for regulating the flow of air located in the other end of said duct and to provide access for cleaning said duct, said shutter being adjusted to regulate the back pressure on said blower, said duct having a vent extending longitudinally thereof, said vent having a lip for directing a stream of air at the point where the cutting wire engages the raised material, so that said stream of air blows the cut edges of the material clear of the cutting wire, returns the remaining uncut portion of the web material to the support means, and frees the cut portion from the support means.

2. A machine for automatically feeding and cutting web-like material including in combination, conveyor means adapted to support and draw the material, clamping means movable to engage said conveyor means and clamp the material thereagainst, lifting means located at a given distance from said clamping means and engaging the material, said lifting means being movable to raise the material off said conveyor means, cutting means located between said clamping means and said lifting means, said cutting means being positioned to engage the material to cut the same when said clamping means is in engagement with the material and said lifting means has moved to raise the material off said conveyor means, actuating means for moving said clamping means and said lifting means, so that said clamping means will engage the material to clamp the material while said lifting means raises the material into engagement with said cutting means, and blower means positioned to direct a stream of air on said cutting means, said blower means upon completion of said cutting action clearing the severed material from said cutting means and returning the uncut material from said raised position to engage said conveyor means.

3. A machine for automatically feeding and cutting web-like material, including in combination, conveyor means adapted to support and draw the material, clamping means movable to engage said conveyor means and clamp the material thereagainst, lifting means located at a given distance from said clamping means and engaging the material, said lifting means being movable to raise the material off said conveyor means, cutting means located between said clamping means and said lifting means, said cutting means being positioned to engage the material to cut the same when said clamping means is in engagement with the material and said lifting means has moved to raise the material off said conveyor means, an air blower positioned on said machine and having an input and an output, an air duct connected to said output, said duct including a vent for directing a stream of air at the point where said cutting wire engages the material, so that said stream of air blows the cut edges of the material clear of said cutting means, cam actuated linkage means coupled to said clamping means and said lifting means to impart motion thereto, so that said clamping means will engage the material to clamp the material, while said lifting means raises the material into engagement with said cutting means to cut the material.

4. A machine for automatically feeding and cutting web-like material including in combination, a conveyor belt adapted to support the material, said belt having a frictional surface for drawing the material thereon, clamping means movable towards said belt to clamp the material thereagainst, lifting means spaced along said belt from said clamping means and having a portion engaging the material, said lifting means operating to move said engaging portion thereof to raise the material off said belt, means for severing said web-like material located between said clamping means and said lifting means, said severing means being engageable with the material to cut the same when said clamping means is in engagement with material and said lifting means has moved to raise the material off said belt, an air blower mounted to said machine, said blower having a blower motor and a filtered air intake and an output, an elongated air duct having one end connected to said output and extending in a direction transverse to said belt, a variable shutter for regulating the flow of air located in the other end of said duct, said shutter being adjusted to regulate the back pressure on said blower motor and to provide access for cleaning said duct, said duct having a vent extending longitudinally along said duct, said vent having a lip for directing a stream of air at the point where said severing means engages the material, so that said stream of air blows the cut edges of the material clear of said severing means, returns the remaining uncut portion to said conveyor belt, and frees the cut portion from said belt, a motor driven cam member, cam follower means engaging said cam member, first linkage means coupling said cam follower means to said clamping means to impart motion thereto, second linkage means coupling said cam follower means to said lifting means to impart motion thereto, sweep means engageable with said belt to sweep the free end of the material into contact with said belt to reestablish frictional engagement therebetween, third linkage means coupling said cam follower means to said sweep means to impart motion thereto, so that said clamping means will engage and clamp the material while said lifting means raises the material into engagement with said severing means to sever the material, and said sweep means straightens the material on said belt after the severing operation.

5. An air blower for use in a machine for feeding and cutting plastic film material which includes conveyor means adapted to support and draw the material, means for raising the film material from the conveyor means, and a cutting wire which is engageable with the raised material for cutting the same, said blower including in combination, a blower structure mounted to the machine and having an air intake and an output, an air duct connected to said output, said duct having a discharge vent for directing a stream of air from a point above the conveyor means downward to the point where the cutting wire engages the material, so that the stream of air blows the cut film material clear of the cutting wire, and returns to the conveyor means the portion of the film material from which a portion is cut.

References Cited by the Examiner

UNITED STATES PATENTS

| 1,651,096 | 11/1927 | Molins | 83—98 |
| 3,076,366 | 2/1963 | Granstedt | 83—98 |

ANDREW R. JUHASZ, *Primary Examiner.*

WILLIAM W. DYER, JR., *Examiner.*

L. B. TAYLOR, *Assistant Examiner.*